US012574753B2

(12) United States Patent
Sevindik

(10) Patent No.: US 12,574,753 B2
(45) Date of Patent: ***Mar. 10, 2026

(54) INTER-SAS SPECTRUM ALLOCATION SYNCHRONIZATION

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,159

(22) Filed: Mar. 6, 2024

(65) Prior Publication Data

US 2024/0267745 A1 Aug. 8, 2024

Related U.S. Application Data

(63) Continuation of application No. 17/329,427, filed on May 25, 2021, now Pat. No. 11,956,641.

(51) Int. Cl.
*H04W 16/14* (2009.01)
(52) U.S. Cl.
CPC .................................. *H04W 16/14* (2013.01)
(58) Field of Classification Search
CPC ..... H04W 16/14; H04W 76/25; H04W 16/12; H04W 16/00; H04W 16/10; H04W 24/02; H04W 72/23; H04W 88/08; H04W 60/00
See application file for complete search history.

(56) References Cited

U.S. PATENT DOCUMENTS

| | | | |
|---|---|---|---|
| 8,582,483 B1 | 11/2013 | Yu et al. | |
| 9,014,118 B2 | 4/2015 | Proctor, Jr. | |
| 10,477,491 B2 | 11/2019 | Mueck et al. | |
| 10,623,943 B1 | 4/2020 | Sevindik et al. | |
| 10,893,417 B1 * | 1/2021 | Gandhi | H04W 48/08 |
| 11,272,575 B1 | 3/2022 | Sevindik | |
| 11,617,182 B2 | 3/2023 | Sevindik | |

(Continued)

OTHER PUBLICATIONS

Khalid, Saran. U.S. Appl. No. 18/181,124, filed Mar. 9, 2023, (22 pages).

(Continued)

*Primary Examiner* — Marcus Hammonds
(74) *Attorney, Agent, or Firm* — Mendelsohn Dunleavy. P.C.; Steve Mendelsohn

(57) ABSTRACT

In a wireless communications system, such as a 5G CBRS system, a Spectrum Access System (SAS) assigns portions of the (CBRS) spectrum to associated base stations (CBSDs). In some embodiments, a central spectrum-database server receives information about spectrum allocations made by two or more different SASs operated by different companies and tabulates that information in a combined spectrum database that each SAS can independently retrieve for use in allocating bandwidth to its CBSDs. In some implementations, the messages between each SAS and multiple associated CBSDs are transmitted via a domain proxy that snoops on multiple spectrum-allocation-related messages (e.g., spectrum grant/revocation messages and/or heartbeat messages) to gather the information to be transmitted to the server, where the information does not include any company- or network-sensitive information.

20 Claims, 5 Drawing Sheets

(56) References Cited

U.S. PATENT DOCUMENTS

| | | | |
|---|---|---|---|
| 2010/0141762 A1 | 6/2010 | Siann et al. | |
| 2014/0185580 A1* | 7/2014 | Fang | H04W 16/14 |
| | | | 370/329 |
| 2016/0112970 A1 | 4/2016 | Chen et al. | |
| 2016/0212624 A1* | 7/2016 | Mueck | H04W 72/56 |
| 2016/0219608 A1 | 7/2016 | Awoniyi-Oteri et al. | |
| 2017/0374557 A1 | 12/2017 | Mueck et al. | |
| 2018/0049213 A1 | 2/2018 | Gholmieh et al. | |
| 2018/0070380 A1 | 3/2018 | Nagaraja et al. | |
| 2018/0098289 A1 | 4/2018 | Visotsky et al. | |
| 2018/0205437 A1 | 7/2018 | Kim et al. | |
| 2018/0278298 A1 | 9/2018 | Takano | |
| 2018/0287722 A1 | 10/2018 | Takano | |
| 2019/0174554 A1 | 6/2019 | Deenoo et al. | |
| 2019/0215698 A1* | 7/2019 | Balachandran | H04W 88/12 |
| 2019/0223025 A1* | 7/2019 | Kakinada | H04W 72/0453 |
| 2019/0306850 A1 | 10/2019 | Zhang et al. | |
| 2020/0008081 A1 | 1/2020 | Ashrafi | |
| 2020/0068548 A1 | 2/2020 | Guan et al. | |
| 2020/0084780 A1* | 3/2020 | Wiatrowski | H04W 16/14 |
| 2020/0329523 A1 | 10/2020 | Yi et al. | |
| 2020/0351818 A1 | 11/2020 | Park et al. | |
| 2021/0014693 A1 | 1/2021 | Syed et al. | |
| 2021/0029549 A1* | 1/2021 | Notargiacomo | H04W 8/183 |
| 2021/0029562 A1* | 1/2021 | Notargiacomo | H04W 8/183 |
| 2021/0067974 A1* | 3/2021 | Guo | H04W 16/14 |
| 2021/0168618 A1* | 6/2021 | Yavuz | H04W 84/18 |
| 2021/0227396 A1 | 7/2021 | Khalid et al. | |
| 2021/0266209 A1 | 8/2021 | Zach et al. | |
| 2021/0282025 A1* | 9/2021 | Bandyopadhyay | H04W 16/18 |
| 2021/0337391 A1 | 10/2021 | Sevindik et al. | |
| 2022/0007198 A1* | 1/2022 | Mahalingam | H04W 16/20 |
| 2022/0007200 A1 | 1/2022 | Sevindik et al. | |
| 2022/0007374 A1 | 1/2022 | Sevindik et al. | |
| 2022/0070680 A1* | 3/2022 | Furuichi | H04W 16/02 |
| 2022/0303782 A1* | 9/2022 | Litjens | H04W 16/14 |
| 2022/0361171 A1 | 11/2022 | Sevindik | |
| 2022/0386131 A1* | 12/2022 | Guo | H04W 16/10 |

OTHER PUBLICATIONS

Notice of Allowance for U.S. Appl. No. 17/308,425; dated Oct. 26, 2023 (9 pages).

* cited by examiner

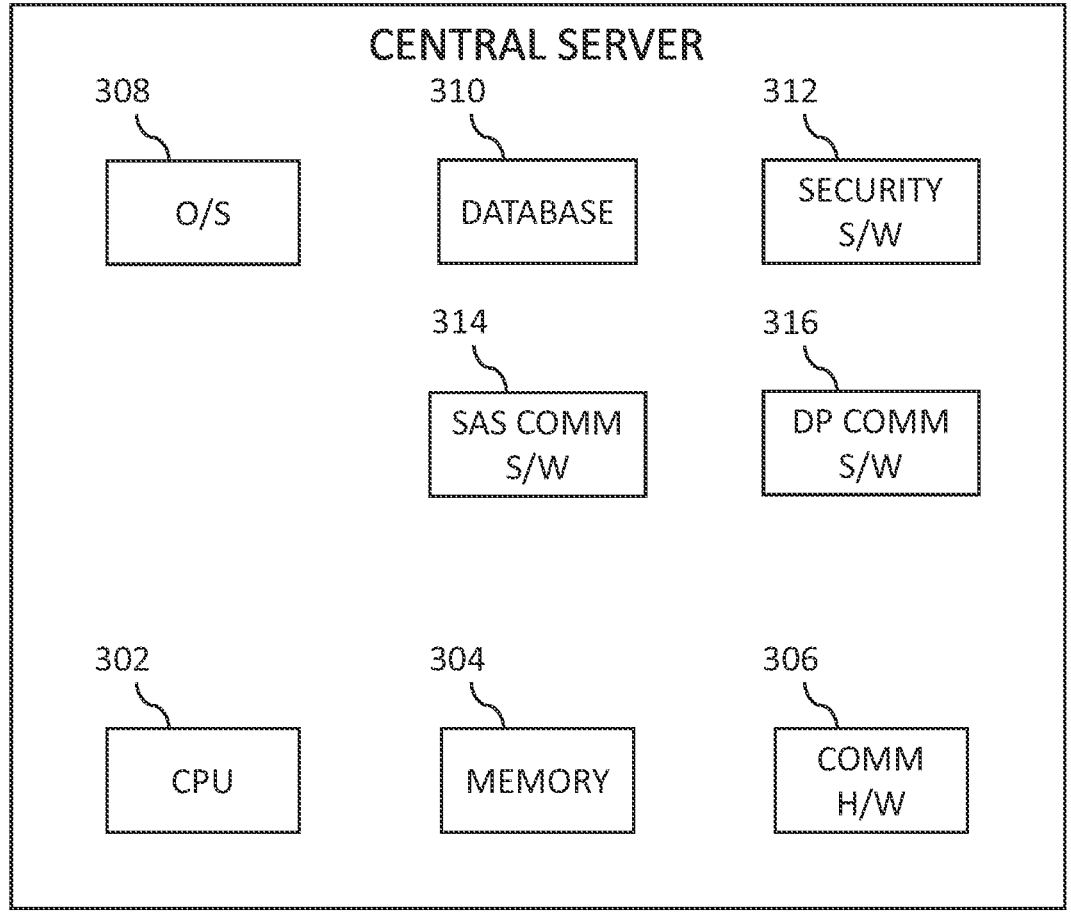
FIG. 3  <u>102</u>

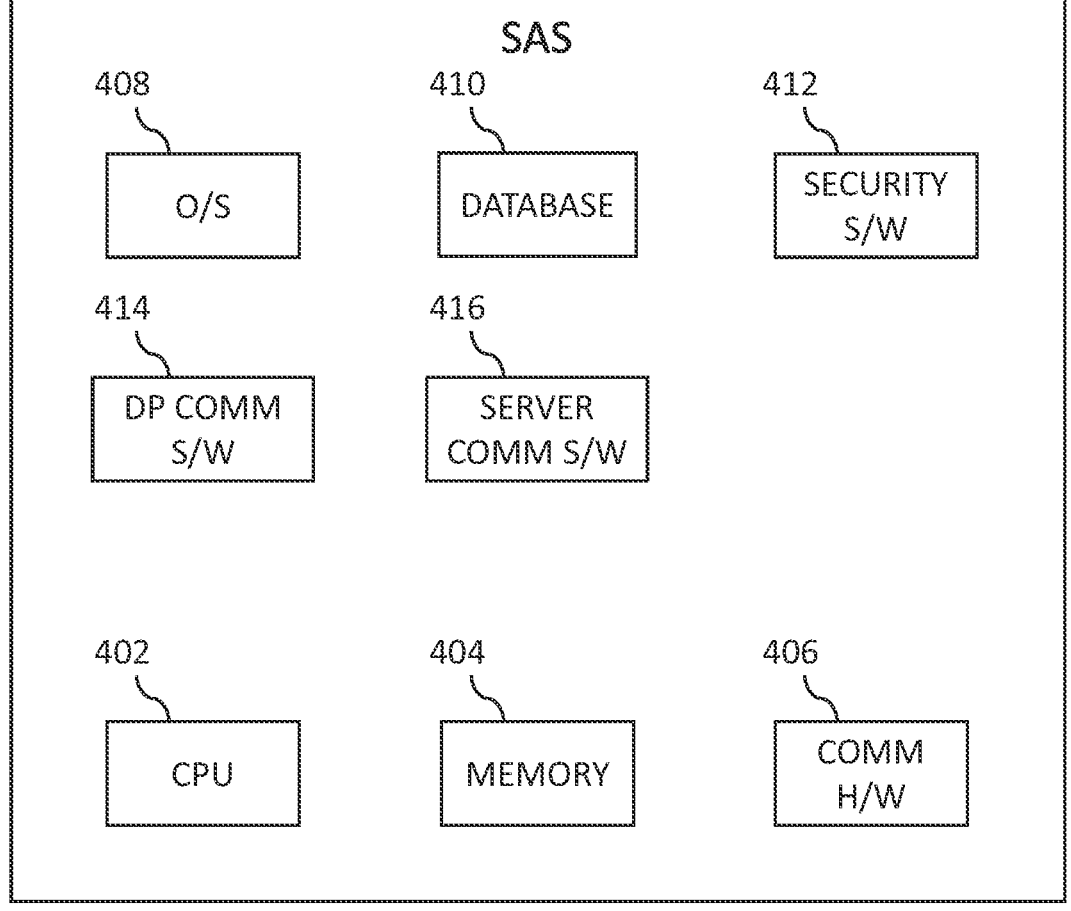
FIG. 4          <u>106</u>

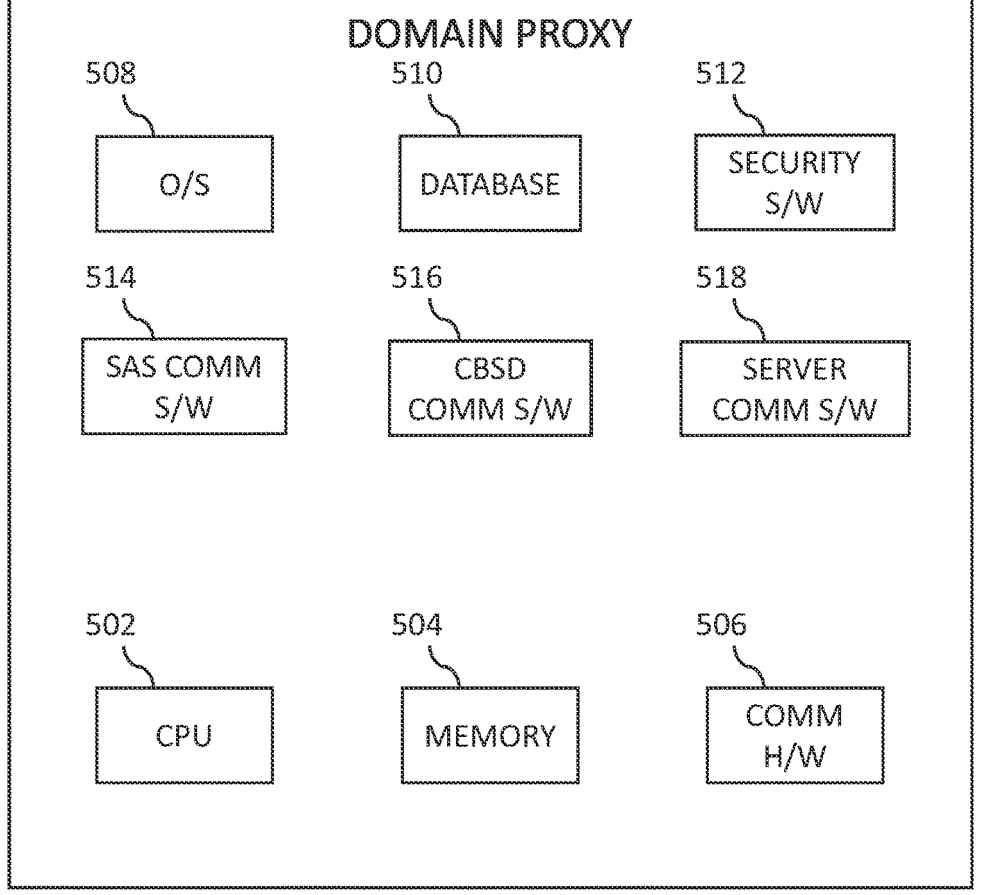
FIG. 5    <u>108</u>

INTER-SAS SPECTRUM ALLOCATION SYNCHRONIZATION

CROSS-REFERENCE TO RELATED APPLICATIONS

This is a continuation of co-pending application Ser. No. 17/329,427, filed on May 25, 2021, the teachings of which are incorporated herein by reference in their entirety.

BACKGROUND

Field of the Disclosure

The present disclosure relates to wireless communications systems and, more specifically but not exclusively, to 5G CBRS communications systems.

Description of the Related Art

This section introduces aspects that may help facilitate a better understanding of the disclosure. Accordingly, the statements of this section are to be read in this light and are not to be understood as admissions about what is prior art or what is not prior art.

In a 5G Citizens Broadband Radio Service (CBRS) communications system, a Spectrum Access System (SAS) is responsible for allocating different portions of the CBRS spectrum to a number of associated base stations referred to as CBRS Devices or CBSDs, for short, that handle the wireless communications with user equipment (UEs) located in the geographical areas covered by the CBSDs. One of the responsibilities of a SAS is to coordinate the spectrum allocations to its associated CBSDs in a way that avoids wireless signal interference between those CBSDs.

If a company operates multiple SASs, then the company can configure its SASs to communicate directly with each other to synchronize their spectrum-allocation databases to coordinate the spectrum allocations between its different SASs to avoid interference between CBSDs associated with different ones of its SASs. For security and confidentiality reasons, such direct inter-SAS communication is not acceptable for SASs operated by different companies. As a result, there is a risk of interference between different CBSDs associated with different SASs operated by different companies in the same geographical area.

SUMMARY

Problems in the prior art are addressed in accordance with the principles of the present disclosure by providing a central "spectrum-database" server that receives spectrum-allocation information for the CBSDs associated with different SASs operated by different companies, maintains a single spectrum-allocation database that tabulates all of the current allocations of spectrum for the different SASs, and makes that spectrum-allocation database available to the different SASs for each of them to use to coordinate the allocation of spectrum to its own associated CBSDs. By receiving only a limited amount of information about the spectrum allocations, the spectrum-database server prevents a SAS operated by one company from accessing sensitive or confidential information about the CBSDs associated with a SAS operated by a different company.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 3 is a combined hardware/software diagram representing the spectrum-database server of FIG. 1 according to certain embodiments of the disclosure;

FIG. 4 is a combined hardware/software diagram representing each SAS of FIG. 1 according to certain embodiments of the disclosure; and FIG. 5 is a combined hardware/software diagram representing each domain proxy of FIG. 1 according to certain embodiments of the disclosure.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
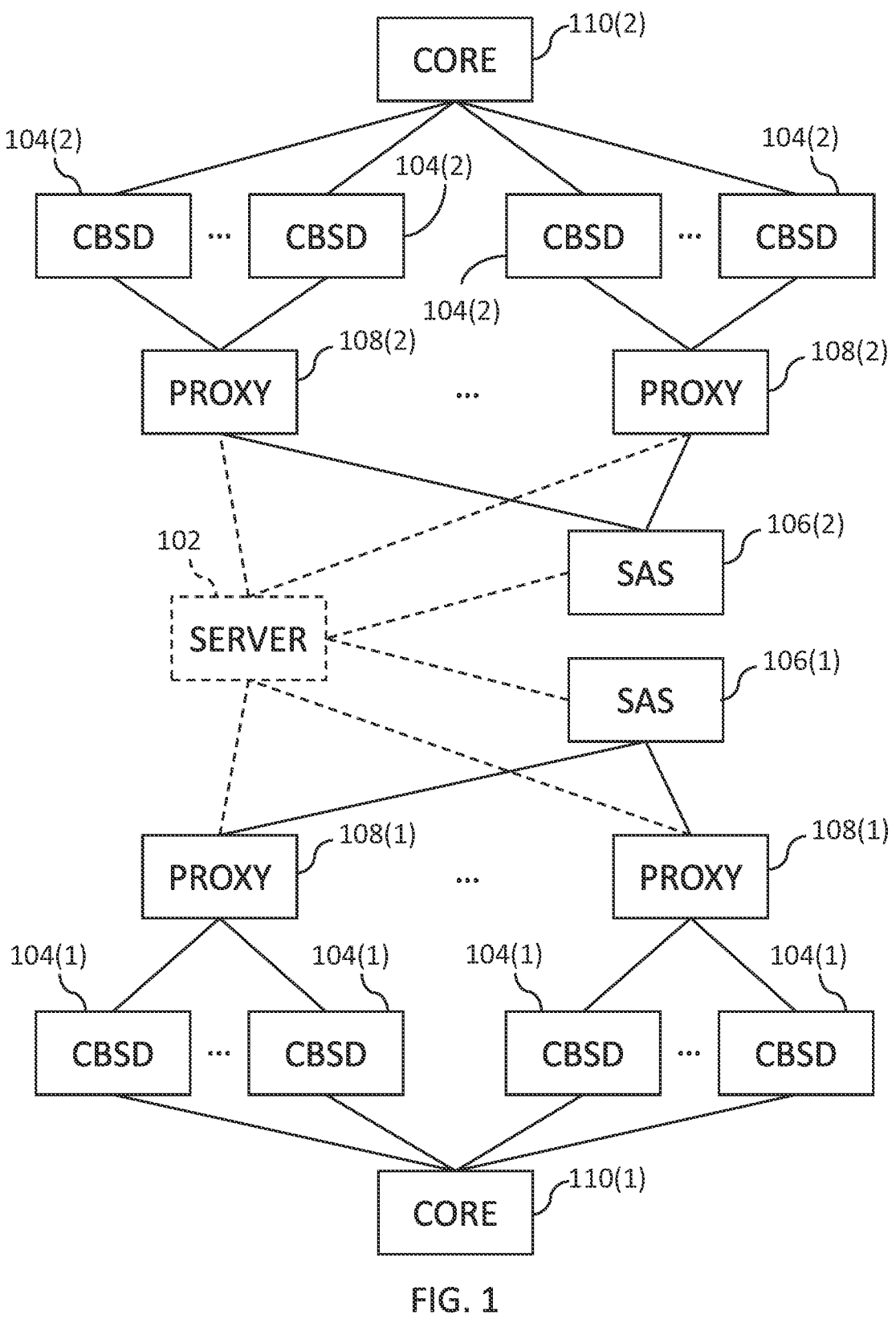
FIG. 1 is a simplified block diagram showing a spectrum-database server of the present disclosure configured to maintain a spectrum-allocation database that tabulates the current allocations of spectrum to the CBSDs associated with two different SASs operated by two different companies.

FIG. 1 is a simplified block diagram showing a spectrum-database server 102 of the present disclosure configured to maintain a spectrum-allocation database that tabulates the current allocations of spectrum to the CBSDs 104(1) and 104(2) associated with two different SASs 106(1) and 106(2) operated by two different companies. Note that FIG. 1 does not show the wireless UEs that transmit and receive wireless traffic to and from the CBSDs 104.

FIG. 1 represents the conventional elements and conventional communication paths of two different CBRS communications systems using solid lines. In particular, a first CBRS communications system has a set of CBSDs 104(1) that transmit and receive UE traffic signals to and from a system core 110(1). In addition, different subsets of the CBSDs 104(1) communicate with the SAS 106(1) via different domain proxies 108(1). A domain proxy 108(1) aggregates the "CBSD-to-SAS" messages from the corresponding subset of associated CBSDs 104(1) for transmission to the SAS 106(1) and reciprocally disaggregates and distributes the "SAS-to-CBSD" messages received from the SAS 106 (1) to the appropriate CBSDs 104(1). The second communications system shown in FIG. 1 has an analogous architecture.

Those skilled in the art will understand that each different company may operate more than one SAS 106 and there may be more than two different companies operating different CBRS communications systems. In those cases, the architecture of FIG. 1 may be scaled up to include additional SASs 106 associated with different domain proxies 108, different CBSDs 104, and different cores 110, where the different domain proxies 108 and the different SASs 106 all communicate with the spectrum-database server 102 in analogous manners.

The SAS-to-CBSD messages include "spectrum-grant" messages, each of which informs a specific CBSD of the grant of a specified spectrum allocation to that CBSD, as well as subsequent "spectrum-revocation" messages, each of which informs a specific CBSD of the revocation of a specified spectrum allocation. The CBSD-to-SAS messages include "heartbeat" messages, each of which informs the SAS that the specific CBSD is still using the specified spectrum allocation.

In a conventional CBRS communications system, each spectrum-grant, spectrum-revocation, and heartbeat message may identify one or more of the following types of information: a system-specific ID number identifying the CBSD 104, an IP address for the CBSD 104, a system-specific ID number identifying the SAS 106, an IP address for the SAS 106, and an identification of the portion of the CBRS spectrum allocated to the CBSD 104.

In addition to the conventional elements and conventional communication paths represented using solid lines, FIG. 1 also represents the new spectrum-database server 102 and its corresponding new communication paths using dashed lines. In particular, each domain proxy 108(1) of the first CBRS communications system and each domain proxy 108(2) of the second CBRS communications system transmits spectrum-allocation-related messages to the spectrum-database server 102, which uses the information in those spectrum-allocation-related messages to maintain the spectrum-allocation database that tabulates information about all of the current spectrum allocations in the two CBRS communications systems. The spectrum-database server 102 makes that spectrum-allocation database available to the two SASs 106(1) and 106(2) of the two different CBRS communications systems.

In certain implementations, each domain proxy 108 snoops on the spectrum-grant and spectrum-revocation messages transmitted from the associated SAS 106 to the associated CBSDs 104 and on the heartbeat messages transmitted from the associated CBSDs 104 to the associated SAS 106. For each such message, the domain proxy 108 (i) identifies (a) the geographical location of the CBSD using a local database that maps the associated CBSDs (by their ID numbers or IP addresses) to their geographical locations (e.g., GPS coordinates), (b) the spectrum allocation identified in the message, and (c) the time of the message and (ii) provides this information to the spectrum-database server 102 without disclosing sensitive or confidential information to the server.

In particular, for a spectrum-grant message, the time of the message indicates the time that the spectrum was allocated; for a spectrum-revocation message, the time of the message indicates the time that the spectrum was deallocated; and, for a heartbeat message, the time of the message indicates a recent time that the spectrum allocation was still being used by the CBSD 104. For each spectrum allocation, the server 102 maintains a record in the spectrum-allocation database that identifies the allocated portion of the CBRS spectrum, the geographical location of that spectrum allocation, the time that the spectrum was allocated, the most recent time that the spectrum was still being used (if provided yet), and the time that the spectrum was deallocated (if provided yet). Each SAS 106 is able to retrieve the entire spectrum-allocation database at a time determined by the SAS 106 independent of the timing of the retrieval of the spectrum-allocation database by any other SAS 106.

Figure 2:
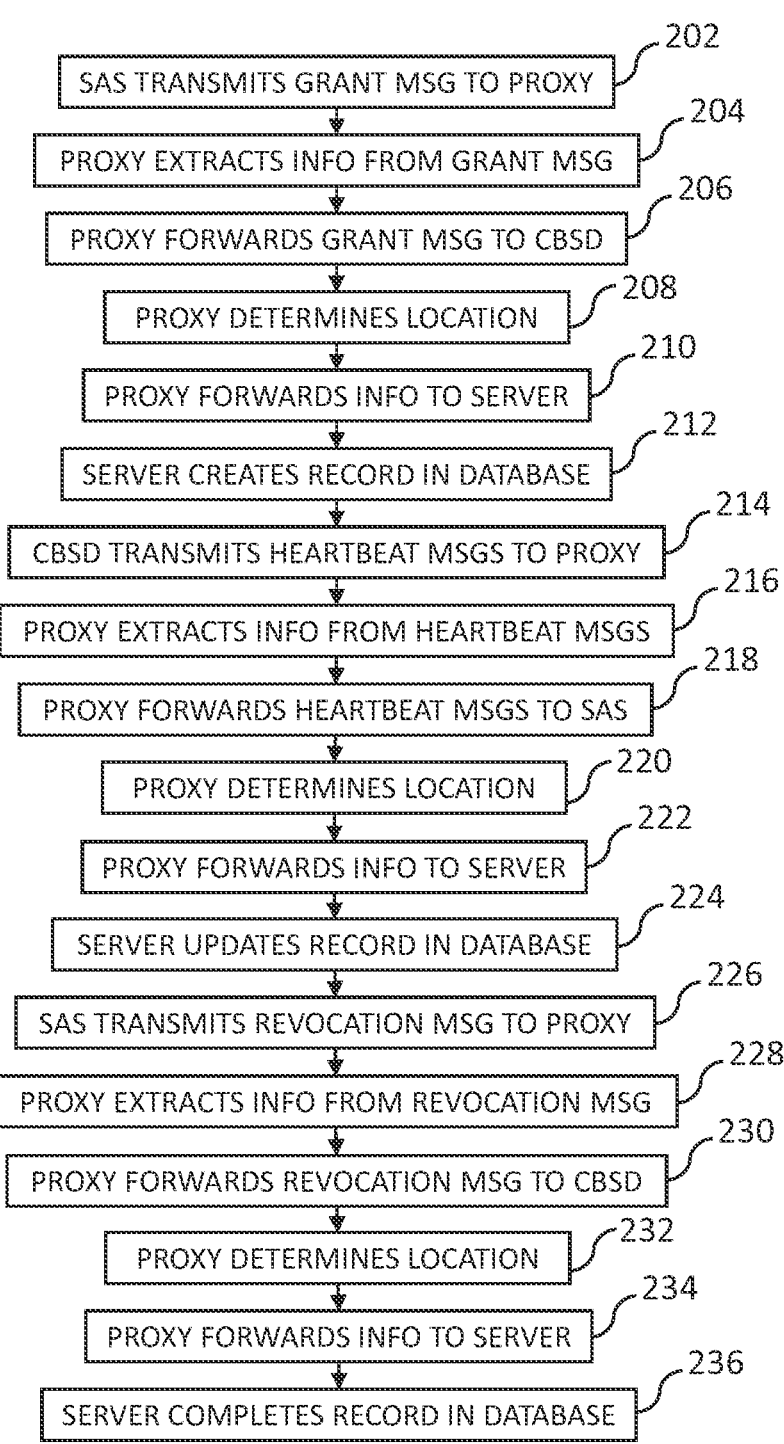
FIG. 2 is a flow diagram representing the processing in the configuration of FIG. 1 for a particular spectrum allocation by a particular SAS to a particular CBSD.

FIG. 2 is a flow diagram representing the processing in the configuration of FIG. 1 for a particular spectrum allocation by a particular SAS 106 to a particular CBSD 104. The processing of FIG. 2 would be performed for each spectrum allocation in the CBRS systems shown in FIG. 1.

In step 202, the SAS 106 transmits a spectrum-grant message to the domain proxy 108 associated with the CBSD 104. In step 204, the domain proxy 108 extracts, from the spectrum-grant message, information such as the identity of the CBSD 104 and the portion of the spectrum being allocated. In step 206, the domain proxy 108 forwards the spectrum-grant message to the CBSD 104. In step 208, the domain proxy 108 uses the identity of the CBSD 104 to determine the geographical location of the CBSD 104 using its local CBSD-location database. In step 210, the domain proxy 108 forwards information identifying the spectrum allocation, the geographical location, and the time of grant to the spectrum-database server 102. In step 212, the spectrum-database server 102 creates a new record in the spectrum-allocation database for the new spectrum allocation.

When the CBSD 104 receives the spectrum-grant message in step 206, the CBSD 104 begins in step 214 to transmit periodic heartbeat messages to the domain proxy 108 indicating that the CBSD 104 is still using the spectrum allocation for wireless communications with its associated UEs. In step 216, the domain proxy 108 extracts, from each heartbeat message, information such as the identity of the CBSD 104 and the spectrum allocation. In step 218, the domain proxy 108 forwards each heartbeat message to the SAS 106. In step 220, the domain proxy 108 uses the identity of the CBSD 104 to determine the geographical location of the CBSD 104 using its local CBSD-location database. In step 222, the domain proxy 108 forwards information identifying the spectrum allocation, the geographical location, and the time of the heartbeat message to the spectrum-database server 102. In step 224, the spectrum-database server 102 updates the record in the spectrum-allocation database for the spectrum allocation to reflect the time of the most-recent heartbeat message.

In step 226, the SAS 106 transmits a spectrum-revocation message to the domain proxy 108. In step 228, the domain proxy 108 extracts, from the spectrum-revocation message, information such as the identity of the CBSD 104 and the portion of the spectrum being deallocated. In step 230, the domain proxy 108 forwards the spectrum-revocation message to the CBSD 104. Note that, when the CBSD 104 receives the spectrum-revocation message in step 230, the CBSD 104 stops transmitting heartbeat messages for that spectrum allocation. In step 232, the domain proxy 108 uses the identity of the CBSD 104 to determine the geographical location of the CBSD 104 using its local CBSD-location database. In step 234, the domain proxy 108 forwards information identifying the spectrum allocation, the geographical location, and the time of revocation to the spectrum-database server 102. In step 236, the spectrum-database server 102 completes the record in the spectrum-allocation database for the spectrum allocation to indicate the time of deallocation.

At any time during the processing of FIG. 2, any SAS 106 may access the spectrum-allocation database from the spectrum-database server 102.

The domain proxy 108 aggregates and disaggregates messaging. In particular, the domain proxy 108 aggregates multiple CBSD-to-SAS messages received from multiple different CBSDs 104, including one or more heartbeat messages, for forwarding as a multi-message communication to the SAS 106. Analogously, the domain proxy 108 disaggregates a multi-message communication received from the SAS 106 and forwards individual SAS-to-CBSD messages, including one or more spectrum-grant and/or one or more spectrum-revocation messages, to the appropriate CBSDs 104. Furthermore, the domain proxy 108 may aggregate spectrum-allocation information extracted from the various spectrum-grant, spectrum-revocation, and heartbeat messages for multiple different spectrum allocations and forward a multi-allocation communication to the spectrum-database server 102, which extracts the information about the multiple different spectrum allocations and updates the spectrum-allocation database accordingly.

Although the domain proxies 108 and SASs 106 are represented in FIG. 1 using solid lines indicating that those elements exist in conventional CBRS communications systems, those skilled in the art will understand that both the domain proxies 108 and the SASs 106 perform new functionality to support the present disclosure. In particular, the snooping on messages to extract and forward spectrum-allocation information to the spectrum-database server 102 is new functionality by the domain proxies 108, and the ability to access the spectrum-allocation database from the spectrum-database server 102 is new functionality by the SASs 106.

FIG. 3 is a combined hardware/software diagram representing the spectrum-database server 102 of FIG. 1 according to certain embodiments of the disclosure. As shown in FIG. 3, spectrum-database server 102 includes hardware components, such as a central processing unit (CPU) 302, a memory (e.g., RAM and/or ROM) 304, and communication hardware (e.g., transceivers) 306, and software modules, such as:

An operating system 308 stored in the memory 304 and executed by the CPU 302 to maintain the spectrum-allocation database;

The spectrum-allocation database 310 stored in the memory 304;

Security software 312 stored in the memory 304 and executed by the CPU 302 to perform Internet Protocol Security (IPsec) tunnel processing, as needed, including possible encryption and decryption of outgoing and incoming messages;

SAS communication software 314 stored in the memory 304 and executed by the CPU 302 to control the communication hardware 306 to execute the (new) IP-based communications between the spectrum-database server 102 and the SASs 106; and Domain proxy (DP) communication software 316 stored in the memory 304 and executed by the CPU 302 to control the communication hardware 306 to execute the (new) IP-based communications between the spectrum-database server 102 and the domain proxies 108.

FIG. 4 is a combined hardware/software diagram representing each SAS 106 of FIG. 1 according to certain embodiments of the disclosure. As shown in FIG. 4, SAS 106 includes hardware components, such as a CPU 402, a memory (e.g., RAM and/or ROM) 404, and communication hardware (e.g., transceivers) 406, and software modules, such as:

An operating system 408 stored in the memory 404 and executed by the CPU 402 to handle the spectrum-allocation database retrieved from the spectrum-database server 102;

The retrieved copy of the spectrum-allocation database 410 stored in the memory 404;

Security software 412 stored in the memory 404 and executed by the CPU 402 to perform Internet Protocol Security (IPsec) tunnel processing, as needed, including possible encryption and decryption of outgoing and incoming messages;

DP communication software 414 stored in the memory 404 and executed by the CPU 402 to control the communication hardware 406 to execute the (conventional) IP-based communications between the SAS 106 and the domain proxies 108; and Server communication software 416 stored in the memory 404 and executed by the CPU 402 to control the communication hardware 406 to execute the (new) IP-based communications between the SAS 106 and the spectrum-database server 102.

FIG. 5 is a combined hardware/software diagram representing each domain proxy 108 of FIG. 1 according to certain embodiments of the disclosure. As shown in FIG. 5, domain proxy 108 includes hardware components, such as a CPU 502, a memory (e.g., RAM and/or ROM) 504, and communication hardware (e.g., transceivers) 506, and software modules, such as:

An operating system 508 stored in the memory 504 and executed by the CPU 502 to snoop on the received spectrum-grant, heartbeat, and spectrum-revocation messages and gather the corresponding spectrum-allocation information for the spectrum-database server 102;

A CBSD-location database 510 stored in the memory 504 that identifies the geographical location of each CBSD 104 associated with the SAS 106;

Security software 512 stored in the memory 504 and executed by the CPU 502 to perform Internet Protocol Security (IPsec) tunnel processing, as needed, including possible encryption and decryption of outgoing and incoming messages;

SAS communication software 514 stored in the memory 504 and executed by the CPU 502 to control the communication hardware 506 to execute the (conventional) IP-based communications between the domain proxy 108 and the associated SAS 106;

CBSD communication software 516 stored in the memory 504 and executed by the CPU 502 to control the communication hardware 506 to execute the (conventional) IP-based communications between the domain proxy 108 and the associated CBSDs 104; and Server communication software 518 stored in the memory 504 and executed by the CPU 502 to control the communication hardware 506 to execute the (new) IP-based communications between the domain proxy 108 and the spectrum-database server 102.

Although the disclosure has been described in the context of the domain proxy 108 identifying the time of the allocation-grant message as the time of the start of the spectrum allocation for the spectrum database, in alternative implementations, the domain proxy 108 identifies the time of the first corresponding heartbeat message as the time of the start of the spectrum allocation for the spectrum database. In some implementations, there might be a delay between the time of the allocation-grant message and the time that the CBSD 104 actually starts to use the allocated bandwidth for wireless communications with UEs.

Although the disclosure has been described in the context of the domain proxy 108 identifying the time of the allocation-revocation message as the time of the end of the spectrum allocation for the spectrum database, in alternative implementations, the domain proxy 108 identifies the time of the end of the spectrum allocation for the spectrum database based on the expiration of a timer indicating that no heartbeat messages have been received for the duration of the timer. In some implementations, there might be a delay between the time of the allocation-revocation message and the time that the CBSD 104 actually stops using the allocated bandwidth for wireless communications with UEs.

Although the disclosure has been described in the context of CBRS communications systems in which all communications between the SASs and their associated CBSDs goes through associated domain proxies, which snoop on those messages and provide relevant information to the spectrum-database server. Those skilled in the art will understand that alternative CBRS communications systems may support direct communications between SASs and their CBSDs in addition to or instead of communications via domain proxies. In that case, each CBSD that communicates directly with a SAS may be configured to transmit spectrum-allocation information directly to the spectrum-database server.

Although the disclosure has been described in the context of 5G CBRS communications systems, those skilled in the art will understand that the present disclosure can be implemented in the context of other suitable communications systems having functionality analogous to the SASs of 5G CBRS communications systems.

In certain embodiments, the present disclosure is a spectrum-database server comprising a processor and communication hardware. The processor is configured to control the spectrum-database server to (i) receive, via the communication hardware, spectrum-allocation-related messages related to spectrum allocations to base stations associated with multiple different spectrum allocation systems (SASs); (ii) maintain a spectrum-allocation database based on information in the spectrum-allocation-related messages; and (iii) make the spectrum-allocation database available to the multiple different SASs via the communication hardware.

In at least some of the above embodiments, the multiple different SASs are configured to be operated by two or more different companies; and the spectrum-database server is configured to refrain from including any base station-specific or company-specific information in the spectrum-allocation database.

In at least some of the above embodiments, the information in a spectrum-allocation-related message comprises one or more of (i) information corresponding to a spectrum-grant message transmitted from a SAS to a base station; (ii) information corresponding to a heartbeat message transmitted from a base station to a SAS; and (iii) information corresponding to a spectrum-revocation message transmitted from a SAS to a base station.

In at least some of the above embodiments, the spectrum-database server is configured to maintain the spectrum-allocation database to identify, for each spectrum allocation, a geographical location of the base station associated with the spectrum allocation, an amount of spectrum allocated, a time of grant of the spectrum allocation, and, if available, a time of continued use of the spectrum allocation and a time of spectrum deallocation.

In at least some of the above embodiments, the spectrum-database server is part of a 5G CBRS system.

In at least some of the above embodiments, at least one spectrum-allocation-related message is a multi-allocation communication received from a domain proxy that handles communications between multiple base stations and the SAS; and the multi-allocation communication comprises information regarding multiple different spectrum allocations for multiple different base stations.

In certain embodiments, the present disclosure is a domain proxy comprising a processor and communication hardware. The processor is configured to control the domain proxy to (i) receive, via the communication hardware, SAS-to-base station messages from a SAS and transmit each SAS-to-base station message to a base station associated with the SAS, wherein the SAS-to-base station messages include a spectrum-allocation-related message related to a spectrum allocation to a base station associated with the SAS; (ii) detect receipt of the spectrum-allocation-related message; and (iii) transmit, via the communication hardware, information related to the spectrum allocation to a spectrum-database server configured to receive spectrum-allocation information from multiple different domain proxies associated with multiple different SASs, maintain a spectrum-allocation database based on the spectrum-allocation information, and make the spectrum-allocation database available to the multiple different SASs.

In at least some of the above embodiments, the multiple different SASs are configured to be operated by two or more different companies; and the domain proxy is configured to refrain from transmitting any base station-specific or company-specific information to the spectrum-database server.

In at least some of the above embodiments, the domain proxy is configured to transmit to the spectrum-database server one or more of: (i) information corresponding to a spectrum-grant message transmitted from a SAS to a base station; (ii) information corresponding to a heartbeat message transmitted from a base station to a SAS; and (iii) information corresponding to a spectrum-revocation message transmitted from a SAS to a base station.

In at least some of the above embodiments, for each spectrum allocation, the domain proxy is configured to transmit to the spectrum-database server information that identifies a geographical location of the base station associated with the spectrum allocation, an amount of spectrum allocated, a time of grant of the spectrum allocation, and, if available, a time of continued use of the spectrum allocation and a time of spectrum deallocation.

In at least some of the above embodiments, the domain proxy is part of a 5G CBRS system.

In at least some of the above embodiments, the domain proxy is configured to transmit the information related to the spectrum allocation in a multi-allocation communication corresponding to multiple spectrum-allocation-related messages received by the domain proxy from multiple different base stations.

In certain embodiments, the present disclosure is a SAS comprising a processor and communication hardware. The processor is configured to control the SAS to (i) access, via the communication hardware, a spectrum-allocation database from a spectrum-database server, wherein the spectrum-allocation database identifies spectrum allocations to multiple different base stations associated with the SAS and one or more other SASs; and (ii) use the spectrum-allocation database to control spectrum allocations to base stations associated with the SAS.

In at least some of the above embodiments, the two or more SASs are configured to be operated by two or more different companies.

In at least some of the above embodiments, the domain proxy is part of a 5G CBRS system.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Also for purposes of this disclosure, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A first spectrum allocation system (SAS) comprising a SAS processor and SAS communication hardware, wherein the SAS processor is configured to control the first SAS to:

control existing first spectrum allocations to first base stations associated with the first SAS;

access, via the SAS communication hardware, a spectrum-allocation database from a non-SAS spectrum-database server to retrieve information in the spectrum-allocation database about one or more existing second spectrum allocations to second base stations associated with a second SAS different from the first SAS, wherein (i) the non-SAS spectrum-database server is separate from the first SAS and the second SAS and (ii) the first and second SASs are operated by two different companies; and use the retrieved information to control new spectrum allocations to one or more of the first base stations associated with the first SAS, wherein the information comprises a geographical location of a second base station associated with an existing second spectrum allocation, an amount of spectrum allocated, a time of grant of the existing second spectrum allocation, a time of continued use of the existing second spectrum allocation, and a time of spectrum deallocation.

2. The first SAS of claim 1, wherein the first SAS is part of a 5G CBRS system.

3. The first SAS of claim 1, wherein the information does not include any base station-specific or company-specific information in the spectrum-allocation database.

4. The first SAS of claim 1, wherein the information comprises one or more of:

information corresponding to a spectrum-grant message transmitted from the second SAS to one of the second base stations;

information corresponding to a heartbeat message received by the second SAS from one of the second base stations; and information corresponding to a spectrum-revocation message transmitted from the second SAS to one of the second base stations.

5. A method for a first spectrum allocation system (SAS), the method comprising the first SAS:

controlling existing first spectrum allocations to first base stations associated with the first SAS;

accessing a spectrum-allocation database from a non-SAS spectrum-database server to retrieve information in the spectrum-allocation database about one or more existing second spectrum allocations to second base stations associated with a second SAS different from the first SAS, wherein (i) the non-SAS spectrum-database server is separate from the first SAS and the second SAS and (ii) the first and second SASs are operated by two different companies; and using the retrieved information to control new spectrum allocations to one or more of the first base stations associated with the first SAS, wherein the information comprises a geographical location of a second base station associated with an existing second spectrum allocation, an amount of spectrum allocated, a time of grant of the existing second spectrum allocation, a time of continued use of the existing second spectrum allocation, and a time of spectrum deallocation.

6. The method of claim 5, wherein the first SAS is part of a 5G CBRS system.

7. The method of claim 5, wherein the information does not include any base station-specific or company-specific information in the spectrum-allocation database.

8. The method of claim 5, wherein the information comprises one or more of:

information corresponding to a spectrum-grant message transmitted from the second SAS to one of the second base stations;

information corresponding to a heartbeat message received by the second SAS from one of the second base stations; and information corresponding to a spectrum-revocation message transmitted from the second SAS to one of the second base stations.

9. A first domain proxy comprising a proxy processor and proxy communication hardware, wherein the proxy processor is configured to control the first domain proxy to:

receive, via the proxy communication hardware, a SAS-to-base station message from a first SAS and transmit the SAS-to-base station message to one of first base stations associated with the first SAS, wherein the SAS-to-base station message includes a first spectrum-allocation-related message related to an existing first spectrum allocation to the first base station associated with the first SAS;

detect receipt of the first spectrum-allocation-related message; and transmit, via the proxy communication hardware, information related to the existing first spectrum allocation to a spectrum-database server that is separate from the first SAS, wherein, for the existing first spectrum allocation, the first domain proxy is adapted to transmit to the spectrum-database server information that identifies a geographical location of the first base station associated with the existing first spectrum allocation, an amount of spectrum allocated, a time of grant of the existing first spectrum allocation, and, if available, a time of continued use of the existing first spectrum allocation and a time of spectrum deallocation.

10. The first domain proxy of claim 9, wherein:

the first domain proxy is adapted to handle communications between multiple first base stations and the first SAS;

at least one of the first spectrum-allocation-related messages is a multi-allocation communication transmitted by the first domain proxy for communications between the multiple first base stations and the first SAS; and the multi-allocation communication comprises information regarding multiple different existing first spectrum allocations for the multiple first base stations.

11. The first domain proxy of claim 9, wherein the first domain proxy is configured to refrain from transmitting any base station-specific or company-specific information to the spectrum-database server.

12. The first domain proxy of claim 9, wherein the first domain proxy is adapted to transmit to the spectrum-database server one or more of:

information corresponding to a spectrum-grant message transmitted from the first SAS to one of the first base stations;

information corresponding to a heartbeat message transmitted from one of the first base stations to the first SAS; and information corresponding to a spectrum-revocation message transmitted from the first SAS to one of the first base stations.

13. The first domain proxy of claim 9, wherein the first domain proxy is part of a 5G CBRS system.

14. The first domain proxy of claim 9, wherein the spectrum-database server is a non-SAS server.

15. A method for a first domain proxy, the method comprising the first domain proxy:

receiving a SAS-to-base station message from a first SAS and transmitting the SAS-to-base station message to one of first base stations associated with the first SAS, wherein the SAS-to-base station message includes a first spectrum-allocation-related message related to an existing first spectrum allocation to the first base station associated with the first SAS;

detecting receipt of the first spectrum-allocation-related message; and transmitting information related to the existing first spectrum allocation to a spectrum-database server that is separate from the first SAS, wherein, for the existing first spectrum allocation, the first domain proxy is adapted to transmit to the spectrum-database server information that identifies a geographical location of the first base station associated with the existing first spectrum allocation, an amount of spectrum allocated, a time of grant of the existing first spectrum allocation, and, if available, a time of continued use of the existing first spectrum allocation and a time of spectrum deallocation.

16. The method of claim 15, wherein:

the first domain proxy handles communications between multiple first base stations and the first SAS;

at least one of the first spectrum-allocation-related messages is a multi-allocation communication transmitted by the first domain proxy for communications between the multiple first base stations and the first SAS; and the multi-allocation communication comprises information regarding multiple different existing first spectrum allocations for the multiple first base stations.

17. The method of claim 15, wherein the first domain proxy refrains from transmitting any base station-specific or company-specific information to the spectrum-database server.

18. The method of claim 15, wherein the first domain proxy transmits to the spectrum-database server one or more of:

information corresponding to a spectrum-grant message transmitted from the first SAS to one of the first base stations;

information corresponding to a heartbeat message transmitted from one of the first base stations to the first SAS; and information corresponding to a spectrum-revocation message transmitted from the first SAS to one of the first base stations.

19. The method of claim 15, wherein the first domain proxy is part of a 5G CBRS system.

20. The method of claim 15, wherein the spectrum-database server is a non-SAS server.

* * * * *